(12) United States Patent
Ryan, Jr.

(10) Patent No.: US 6,766,455 B1
(45) Date of Patent: Jul. 20, 2004

(54) SYSTEM AND METHOD FOR PREVENTING DIFFERENTIAL POWER ANALYSIS ATTACKS (DPA) ON A CRYPTOGRAPHIC DEVICE

(75) Inventor: Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/455,015

(22) Filed: Dec. 9, 1999

(51) Int. Cl.[7] .................. G06F 11/30; G06F 17/60; G06F 17/00
(52) U.S. Cl. .................. 713/189; 713/193; 705/60; 705/401
(58) Field of Search .................. 713/189, 193; 705/60, 401

(56) References Cited

U.S. PATENT DOCUMENTS

| | | | |
|---|---|---|---|
| 4,641,346 A | 2/1987 | Clark et al. | |
| 4,641,347 A | 2/1987 | Clark et al. | |
| 4,725,718 A | * 2/1988 | Sansone et al. | 235/495 |
| 4,757,537 A | 7/1988 | Edelmann et al. | |
| 4,775,246 A | 10/1988 | Edelmann et al. | |

(List continued on next page.)

FOREIGN PATENT DOCUMENTS

| | | |
|---|---|---|
| EP | 0268882 | 11/1987 |
| EP | 0463261 | 12/1990 |
| FR | 2793904 | 5/1999 |
| GB | 929780 | 6/1963 |
| JP | 08-263972 | 11/1996 |
| WO | 98/20461 | 5/1998 |
| WO | 99/63423 | 12/1999 |
| WO | 99/66452 | 12/1999 |
| WO | 00/26868 | 5/2000 |
| WO | 00/50976 | 8/2000 |
| WO | 00/54230 | 9/2000 |

OTHER PUBLICATIONS

FIPS, 140–1, Security Requirements for Cryptographic Modules, National Institute for Standards and Technology Jan. 1994.
USPS draft specifications: Information Based Indicia program (IBIP) Indicium Specification Jun. 13, 1996.
Information Based Indicia Program Security Device Specification Jun. 13, 1996.
Information Based Indicia Program Host System Specification Oct. 9, 1996.
Kuhn, M.: "Re: Power analysis of AES candidates" Internet Disclosure, the Mail Archive, 'Online! Sep. 15, 1999, XP002232184.
Kocher, P. et al. "Differential Power Analysis," 19TH Annual International Cryptology Conference, Santa Barbara, CA, Aug. 15–19, 1999, Proceedings, pp. 388–397, XP–000863414, ISBN 3–540–66347–9.

*Primary Examiner*—Matthew Smithers
*Assistant Examiner*—Courtney D. Fields
(74) *Attorney, Agent, or Firm*—Brian A. Lemm; Angelo N. Chaclas

(57) ABSTRACT

System and method for performing cryptographic operations include providing at least one processor for performing cryptographic operations, memory coupled to the processor for use in performing the cryptographic operations; and a storage component coupled to the processor for storing and retrieving information calculated and used in the cryptographic operation. The processor, memory and storage component are securely enclosed whereby direct access to the cryptographic operations is prevented. A power source, which is external to the secure enclosure, is coupled to and supplies power to the processor, the memory and the storage component. Circuitry within the enclosure maintains a constant power drain on the power source.

18 Claims, 3 Drawing Sheets

U.S. PATENT DOCUMENTS

| | | |
|---|---|---|
| 4,802,218 A | 1/1989 | Wright et al. |
| 4,831,555 A | 5/1989 | Sansone et al. |
| 4,853,961 A | 8/1989 | Pastor |
| 4,932,053 A | 6/1990 | Fruhauf et al. |
| 4,997,288 A | 3/1991 | Rosenow |
| 5,500,601 A * | 3/1996 | Lisart et al. ............... 324/713 |
| 5,533,123 A | 7/1996 | Force et al. |
| 5,995,629 A | 11/1999 | Reiner |
| 6,154,734 A * | 11/2000 | Bailey et al. ............... 705/410 |
| 6,327,661 B1 | 12/2001 | Kocher et al. |
| 6,419,159 B1 * | 7/2002 | Odinak ....................... 235/492 |
| 6,498,404 B1 * | 12/2002 | Thuringer et al. ............ 307/32 |
| 6,510,518 B1 | 1/2003 | Jaffe et al. |
| 6,594,760 B1 | 7/2003 | Ryan, Jr. et al. |

* cited by examiner

SYSTEM AND METHOD FOR PREVENTING DIFFERENTIAL POWER ANALYSIS ATTACKS (DPA) ON A CRYPTOGRAPHIC DEVICE

RELATED APPLICATIONS

The present application shares common elements of disclosure with commonly assigned U.S. application Ser. No. 09/217,977; titled SYSTEM AND METHOD FOR SUPPRESSING CONDUCTED EMISSIONS BY A CRYPTOGRAPHIC DEVICES, now U.S. Pat. No. 6,594,760, and U.S. application Ser. No. 09/458,638; titled SYSTEM AND METHOD FOR SUPPRESSING CONDUCTED EMISSIONS BY A CRYPTOGRAPHIC DEVICE COMPRISING AN INTEGRATED CIRCUIT.

BACKGROUND OF THE INVENTION

The subject invention relates generally to systems for carrying out cryptographic processes and, more particularly, to systems and methods for increasing the security of such systems; particularly such systems used to verify the payment of postage.

Cryptographic systems have many applications both for the secure transmission of information and for the authentication and verification of the source of information. One such application is the verification of postage.

The vast majority of the Posts around the world require prepayment for postal services provided by the Posts. Prepayment, however, requires verifiable evidence of paid postage. The traditional postage stamp is a prime example of such evidence.

Another is the use of postage meters, which alleviate some shortcomings of postage stamps. The first postage meters were mechanical devices which securely coupled printing and accounting functions. The mechanical meter, which was perfected over the years, became a widespread basic business machine. The accounting and machine control functions were computerized when electronic postage meters were introduced in the late seventies. This enabled new features, including departmental accounting and computerized meter resetting. However, the fundamental security of postage evidencing remained the same; depending on two features: 1) physical security of the printing process, i.e., printing of postage evidence can not occur without appropriate accounting, and 2) forensic delectability, i.e., fraudulent postal indicia can be distinguished from legitimate indicia.

Coupling the printing and accounting mechanism within a secure tamper-evident enclosure provides physical security of printing. Inspection of the device normally reveals tampering. Effective forensic delectability of fraudulent postal indicia depends on non-availability of alternative mechanisms suitable for forging indicia. Until recently, serious attempts to generate fraudulent indicia using an alternate printing mechanism were detectable.

Today, the possible use of readily available, inexpensive computer-driven printers for printing postage evidence offers new opportunities for customer convenience and substantial cost advantages. However, the use of such printers requires new ways of verifying postage evidence, as was first suggested in U.S. Pat. Nos. 4,641,347, 4,641,346, 4,757,537, and 4,775,246. At that time, it was realized that the security of postage evidencing depends on the security of the information printed in the indicium, including message authentication and integrity.

U.S. Pat. No. 4,831,555 and 4,725,718 extended this idea to unsecured printing of postage; disclosing the necessity that at least some of the information in the indicium must appear random to a party not in possession of some secret. Such random looking information is commonly referred to as a digital token.

The basis of postal revenue security in the digital world is two new requirements: 1) security of the digital token generating process, i.e., digital tokens can not be generated without appropriate accounting, and 2) automatic delectability, i.e., fraudulent digital tokens can be detected by automatic means.

A cryptographic transformation applied to selected data on the mailpiece produces the digital token. The data may include postage value, date, postal code of the geographical deposit area, recipient address information, meter data, and piece count. Such data is commonly referred to as postal data. The secret used to generate the digital token is generally a cryptographic key held within the accounting device. A verifier, with access to a verifying key corresponding to the accounting device secret, validates the digital token. Several cryptographic algorithms and protocols have been considered for this purpose. U.S. Pat. No. 4,853,961 describes critical aspects of public-key cryptography for mailing applications. See José Pastor, CRYPTOPOST, A Universal Information-Based Franking System for Automated Mail Processing, Proceedings of the Fourth Advanced Technology Conference of the U.S. Postal Service, Vol. I, pp. 429–442, November 1990. See also José Pastor, CRYPTOPOST, A Cryptographic Application to Mail Processing, Journal of Cryptology, 3 (2), pp. 137–146, November 1990.

Two methods of presenting a postal verifier with fraudulent evidence of payment are a counterfeited indicium and a copied indicium. The former is an unpaid indicium that appears legitimate; in particular which will satisfy a cryptographic verification process. The latter is a replica of a legitimate paid indicium. Such counterfeit indicia will necessarily satisfy any cryptographic verification process and must be detected by other means; e.g. duplicate mailpiece numbers, etc., which form no part of the present invention. The present invention addresses the prevention of counterfeit indicium.

A counterfeit indicium can be detected by verifying the digital token. Verification proves that the digital token was generated by a cryptographic algorithm with access to the secret meter key. The information printed in the indicium and access to a verifying key are sufficient for the detection of counterfeited indicia as long as the secret meter key is confidential. In a public-key system, a digital signature provides the data authentication and integrity check. In a symmetric-key system a message authentication code (MAC) provides a similar check.

Assuming integrity of the verification software and hardware, only a compromised meter secret-key can produce verifiable counterfeit indicia. Meters can be compromised by violating the physical protection of the key by tampering, or by deriving the key from indicia data by cryptanalysis. Generally, tampering is detectable if the physical protection of the secure component of the postage metering system is adequate, for example as set forth in FIPS 140-1, Security Requirements for Cryptographic Modules, National Institute for Standards and Technology, January 1994, and protection against physical tampering forms no part of the subject invention.

In general various cryptographic operations for generating digital tokens to authenticate postal indicia and to verify such indicia are well known and details of various systems need not be discussed further here for an understanding of the subject invention except to note that robustness of all such operations against cryptanalysis depends on the difficulty of solving certain mathematical problems, for example, discrete logarithm problems or factoring a large composite number. (see: The USPS published draft specifications: The INFORMATION BASED INDICIA PROGRAM (IBIP) INDICIUM SPECIFICATION, dated Jun. 13, 1996; The INFORMATION BASED INDICIA PROGRAM POSTAL SECURITY DEVICE SPECIFICATION, dated Jun. 13, 1996; and The INFORMATION BASED INDICIA PROGRAM HOST SYSTEM SPECIFICATION, dated Oct. 9, 1996, which together define the U.S.P.S.'s proposed requirements for a postage payment system based upon cryptographically secured indicia.)

As part of its proposed Information-Based Indicia Program (IBIP), the USPS has proposed 1024 bit RSA, 1024 bit DSS or 160 bit ECDSA as a measure of robustness.

Presently, there are two postage metering types: closed systems and open systems. In a closed system, the system functionality is solely dedicated to metering activity. An open system metering device is a postage evidencing device with a non-dedicated printer that is not securely coupled to a secure accounting module. Open system indicia printed by the non-dedicated printer are made secure by including addressee information in the encrypted evidence of postage printed on the mailpiece for subsequent verification. Examples of open system metering devices include personal computer (PC) based devices with single/multi-tasking operating systems, multi-user applications and digital printers.

Conventional closed system mechanical and electronic postage meters have heretofore secured the link between printing and accounting. The integrity of the physical meter box has been monitored by periodic inspections of the meters. Digital printing postage meters, which are closed system postage meters, typically include a digital printer coupled to a metering (accounting) device, which is referred to herein as a postal security device (PSD). Digital printing postage meters have removed the need for physical inspection by cryptographically securing the link between the accounting and printing mechanisms. In essence, new digital printing postage meters create a secure point to point communication link between the accounting unit and printhead. See, for example, U.S. Pat. No. 4,802,218, issued to Christopher B. Wright et al and now assigned to the assignee of the present invention.

An example of a digital printing postage meter with secure printhead communication is the Personal Post Office "manufactured by Pitney Bowes Inc. of Stamford, Conn. An example of a digital printing postage meter in a secure housing is the PostPerfect" also manufactured by Pitney Bowes Inc. Either type of digitally printing system can use cryptographically secured digital tokens (though closed systems may not).

As noted above the security of cryptographically secured postage metering systems, as well as other cryptographic information systems, is based on an assumption that the secret information, i.e., the crypto keys, stored within a secure cryptographic device are protected against disclosure to any attacker. With physical security in effect, it has been assumed that an attacker could only obtain crypto keys either by trying all the possible crypto keys associated with the algorithm being used (symmetric algorithms) or by carrying out a complex mathematical search (asymmetric algorithms). For accepted cryptographic algorithms, this search is prohibitive, e.g. obtaining a 1024 bit RSA key requires 230 years of 300 Mhz PC computing.

A recently published technique, Differential Power Analysis (DPA), undermines this assumption and seriously threatens the security of cryptographic devices. The technique involves observation and analysis of fluctuations on the power line of a cryptographic device (hereinafter sometimes "conducted emissions") to determine the cryptographic secrets, i.e., the crypto keys, used by the device. DPA attack allows one to extract secret protected information from a supposedly secure cryptographic device by measuring variations in power consumption over time, and then applying sophisticated analysis to this information. As the cryptographic processor performs its cryptographic functions, such as encryption or signing; transistors comprising the processor switch on and off, which changes the amount of current drawn from the source supplying power to the processor. Assuming the attacker has some knowledge of the functions performed by the cryptographic processor, the attacker can correlate the current changes with data being processed and the crypto keys being used. Any type of secure cryptographic device that obtains its operating power from an external source is potentially susceptible to the attack. Such devices include smart cards, PC (PCMCIA) cards and printed circuit boards, including devices that are housed within a protected enclosure. If such a cryptographic device is subject to DPA attack, then the crypto key can be obtained in a matter of days or weeks. Many of the proposed countermeasures to the DPA attack involve the introduction of signal noise or filters on the power line, random timing and delays during cryptographic processing, and the introduction of extraneous operations. These countermeasures make the attack much more difficult. However, an attacker can overcome them by obtaining more samples of power line fluctuations and applying more sophisticated analytical techniques.

While it is important that the security community at large find means either to defeat this attack, or to at least greatly lengthen the time and expertise needed to successfully carry it out, it is believed particularly important for the successful adoption of cryptographically secured postage metering systems. In many, if not most other cryptographic systems, cryptographic devices and their associated keys are in the custody of the "owner" who, in principle, has incentive to protect them. Postage metering systems however are not used in the custody of either party most concerned with system integrity, the system vendor or the Post, but by a mailer; who, if dishonest, has every reason to try to defeat the system. To further complicate the problem, a desired advantage of digital postage metering systems is the reduced need for physical inspections; further opening the window of opportunity for the dishonest mailer. And the large number of systems in use will greatly increase the chances that some will fall into the hands of the dishonest; and even a single meter which is compromised can be used to generate substantial amounts of fraudulent indicia since a successfully counterfeited indicium will not be readily detected by the methods used to detect simple duplicate indicia. Additionally postage metering systems can send thousands of encrypted messages, i.e. postal indicia, a day; greatly simplifying the sampling task of the DPA attacker. And all these problems must be overcome without adding substantially to postage costs.

Similar considerations also apply to other types of value metering systems, which are systems which similarly account for and evidence the delivery, receipt, or payment for other forms of value (e.g. tax stamp meters) by generating indicia or other types of messages, which may be secured cryptographically.

Thus it is an object of the subject invention to provide cryptographic devices, and particularly cryptographically secured postage metering systems, with protection against DPA attack.

BRIEF SUMMARY OF THE INVENTION

The above object is achieved and the disadvantages of the prior art are overcome in accordance with subject invention which includes a method of protecting a cryptographic device performing cryptographic operations from DPA attack and a device so protected. The cryptographic device is enclosed within a physically secure environment. Power is provided to the cryptographic device from a power source external to the physically secure environment and additional circuitry connected to the power source and the cryptographic device maintains a constant power drain on the power source as the cryptographic device performs various operations.

According to one aspect of the subject invention at least a part of the additional circuitry is located within the secure environment.

According to another aspect of the subject invention the additional circuitry includes a current source and a voltage regulating circuit, the voltage regulating circuit being connected between the power input of the cryptographic device and ground.

According to another aspect of the subject invention at least those parts of the additional circuitry carrying separate components of the total current from the power source are within the secure environment.

According to still another aspect of the subject invention the cryptographic operations generate a digital token for a postal indicium.

According to another aspect of the subject invention the cryptographic operations generate a secure message for a value metering system.

Other objects and advantages of the subject invention will be apparent to those skilled in the art from consideration of the attached drawings and the detailed description set forth below.

DETAILED DESCRIPTION OF THE PRESENT INVENTION

Figure 1:
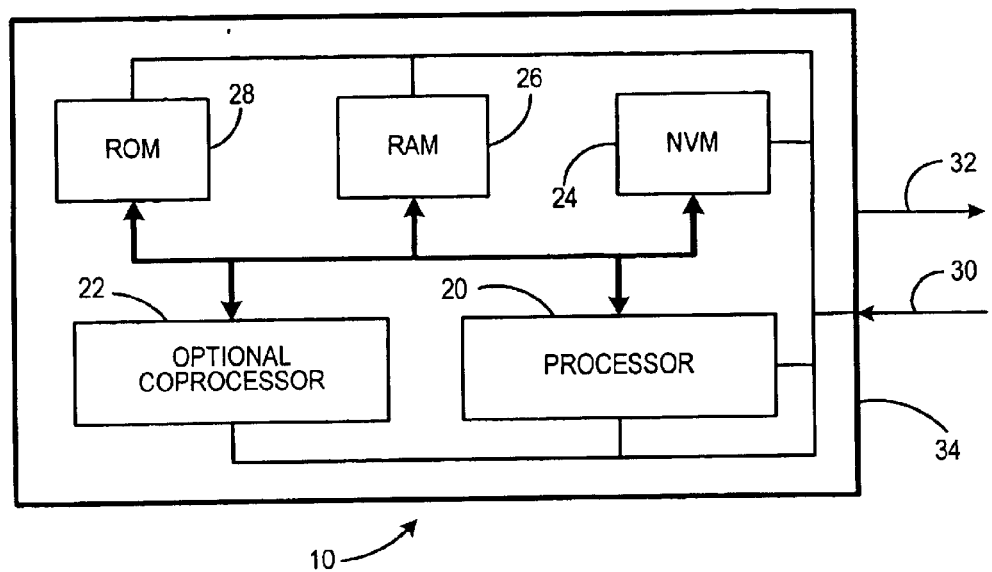
FIG. 1 is a block diagram of a traditional cryptographic device (prior art)

Referring now to FIG. 1, a block diagram of a traditional cryptographic device, generally designated 10, is shown.

Cryptographic device 10 includes a conventional processor 20, coupled to an optional cryptographic coprocessor 22 for performing cryptographic operations, non-volatile memory 24, random access memory 26 and read-only memory 28. Cryptographic device 10 is enclosed within a secure housing 34. The secure housing 34 may be any conventional means for preventing access to cryptographic device 10. For example, secure housing 24 may be an integrated circuit chip encased in an epoxy or ceramic housing that prevents access to the integrated circuit without destruction of the integrated circuit. Power to cryptographic device 10 is input at power line 30. Input/output communications occur at I/O line 32. It will be understood that cryptographic device 10 may be implemented as any number of discrete components or as a single integrated circuit, such as a smart card.

In a preferred embodiment, device 10 can comprise a postage metering system where processor 20 is controlled by program code stored in read-only memory 28, to carry out the functions of a postage metering system such as accounting for postage in non-volatile memory 24 and controlling a printer (not shown) to print a postal indicium including a digital token formed by encryption of postal information by co-processor 22. Details of the construction, programming and operation of such postage metering systems are known and need not be discussed further here for an understanding of the subject invention except to note that, as discussed above, the protection of the crypto-keys used from side-channel attacks such as DPA is both critical to the security of such postage metering systems and difficult to achieve within the constraints of such systems.

In other embodiments of the subject invention device 10 can comprise other types of value metering systems.

Figure 2:
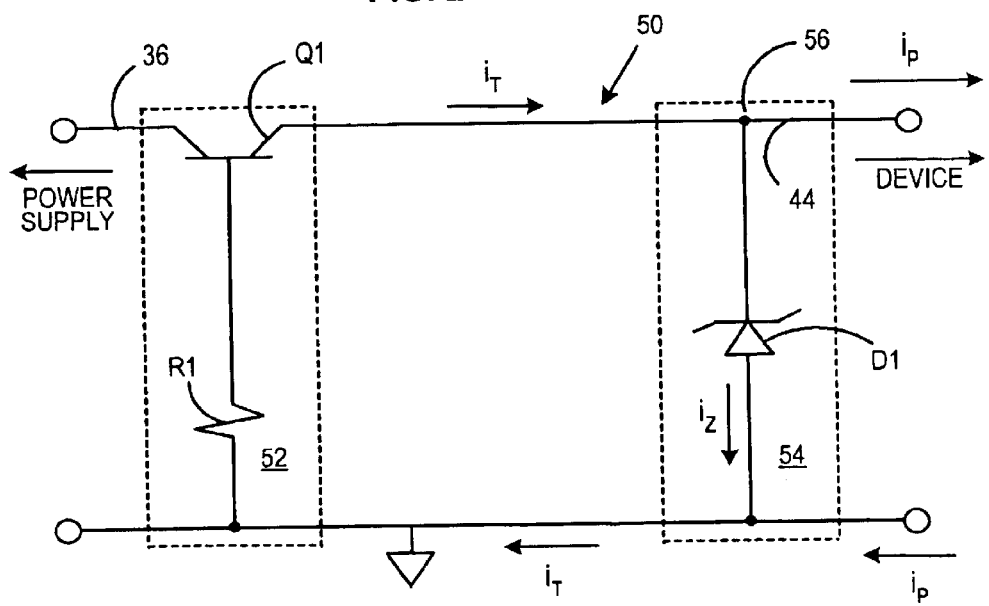
FIG. 2 is a circuit in accordance with the present invention for maintaining a constant power drain on a power source.

Referring now to FIG. 2, a power regulating circuit, generally designated 50, is shown that can be used with cryptographic device 10 in accordance with the present invention. Circuit 50, which is connected between a power source and a device as shown in FIG. 2 maintains a constant current flow and power drain from the power source. Circuit 50 includes a current source 52 and voltage regulating circuit 54. In the embodiment shown in FIG. 2, current source 52 is shown as single transistor Q1 and resistor R, and voltage regulator 54 is shown as zenner diode D for simplicity of illustration. Those skilled in the art will recognize, however, that more sophisticated and complex circuits are easily designed and may be appropriate to provide higher levels of protection.

Current source 52 is connected to line 30 through line 36 and provides constant current $i_T$, and thus constant power to the device and regulator 54 through line 44. Regulator 54 ensures that the device sees a constant voltage. At node 56 current $i_T$ divides into components $i_P$ which drives the device and $i_Z$ which flows through regulator 54. In general, as the device performs various operations the current $i_P$ will vary while regulator 54 holds the input voltage constant and varies $i_Z$ so that $i_P + i_Z = i_T$, thus holding the power drain from source constant.

Figure 3:
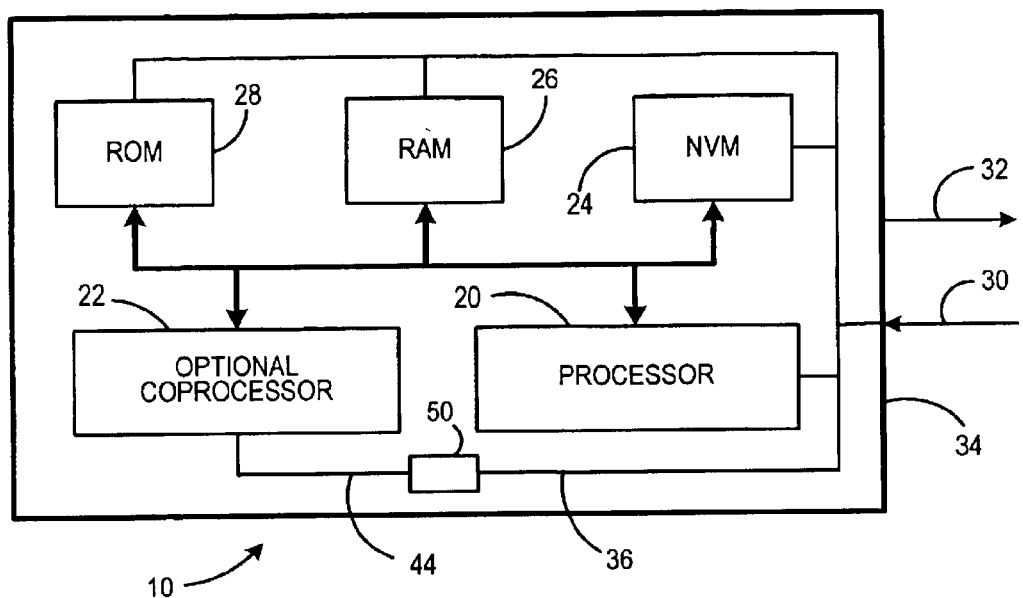
FIG. 3 is a block diagram of a cryptographic device incorporating the circuit of FIG. 2 in accordance with the subject invention.

FIG. 3 shows an embodiment of the subject invention where circuit 50 is incorporated into the cryptographic device of FIG. 1. In FIG. 3 circuit 50 is connected between coprocessor 22 and an external power source (not shown) through line 30. Thus power fluctuations resulting from cryptographic operations are almost entirely decoupled from line 30 and are substantially not observable outside housing 34, and DPA attacks are made much more difficult.

Figure 4:
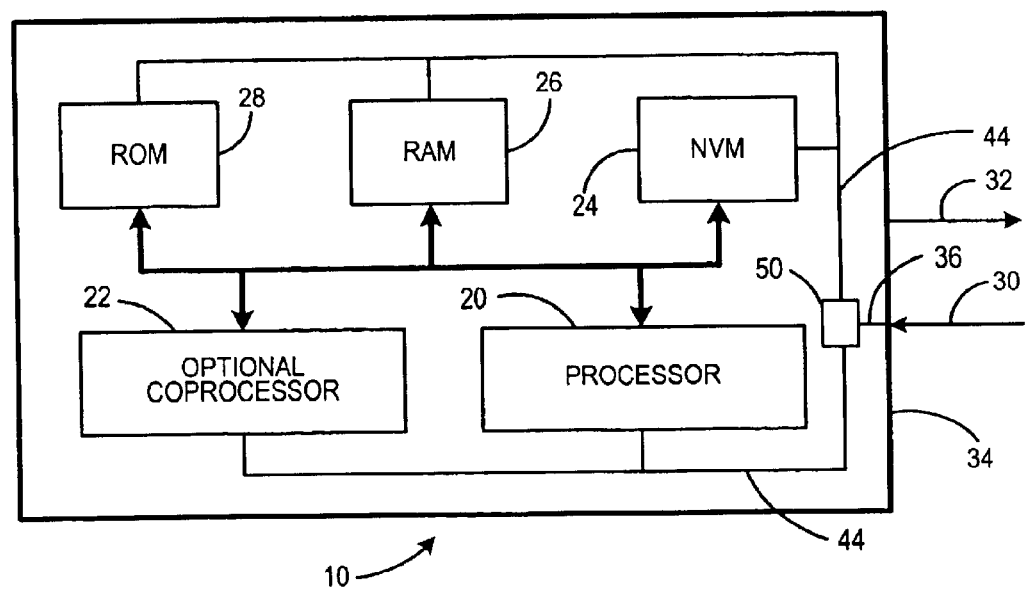
FIG. 4 is a block diagram of a cryptographic device incorporating the circuit of FIG. 2 in accordance with another embodiment of the subject invention.

FIG. 4 show another embodiment wherein circuit 50 provides power to the whole of device 10. This embodiment is used where coprocessor is either not included in device 10 or where processor 20 performs some part of the critical operations.

Particular values for components of circuit 50 in particular applications will vary for particular applications. Selection of these values for particular applications is well within the abilities of a person skilled in the art.

It is apparent from inspection of FIG. 2 that at least those parts of circuit 50 downstream from node 56 (i.e. those parts of circuit 56 which carry the components of $i_T$ separately) must be within housing 34. If an attacker can penetrate housing 34 DPA can be conducted on line 44.

Figure 5:
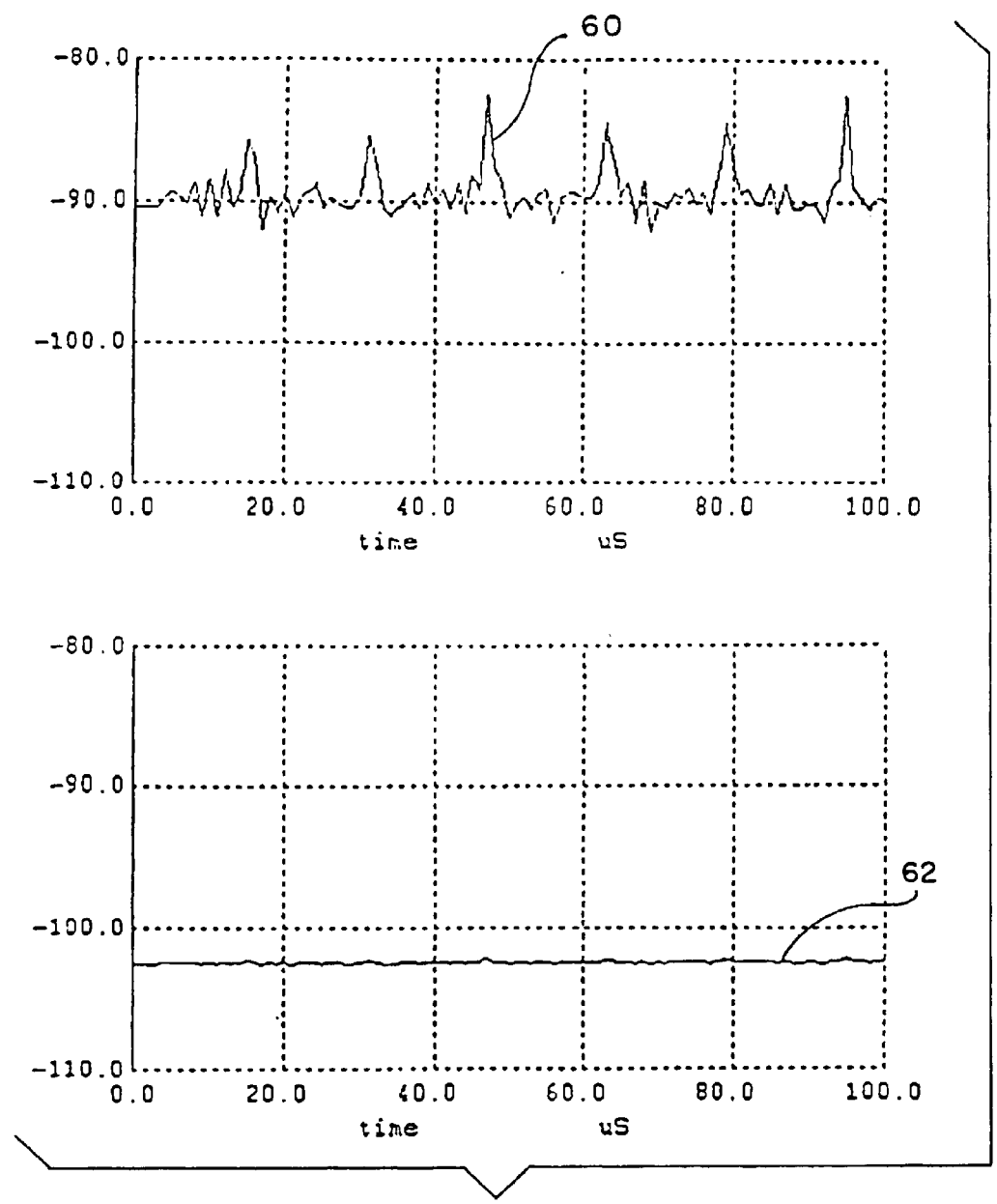
FIG. 5 is a graph comparing the current drawn by a portion of an RSA signature generation performed by the device of FIG. 1 prior to implementation of the present invention and subsequent to implementation of the present invention.

Referring now to FIG. 5, a graph 60 is representative of the current drawn, as measured at line 30, by a portion of an RSA signature generation performed by cryptographic device substantially similar to device 10 without implementation of the subject invention. The difference between squaring and multiply operations can be clearly seen. Multiply operations require more power and therefore are represented by the higher peaks than squaring operations. The RSA key used can be easily derived from the graph 60 using the DPA attack; which need not be discussed further here for an understanding of the subject invention. Graph 62 shows the effectiveness of the subject invention. The same portion of the RSA signature generation as shown in graph 60 is shown in graph 62 after the addition of power storage circuit 50, in the form of an external circuit, to the cryptographic device. It is noted that the peaks representative of the square and multiply operations previously observable in graph 60 are no longer observable in graph 60.

While the subject invention has been disclosed and described with reference to embodiments thereof, it will be apparent, as noted above, that variations and modifications may be made therein. It is, thus, intended in the following claims to cover each variation and modification that falls within the true spirit and scope of the present invention.

What is claimed is:

1. A method of protecting a cryptographic device performing cryptographic operations from DPA attack, the method comprising the steps of:
   a) enclosing the cryptographic device within a physically secure environment;
   b) providing power to the cryptographic device from a power source, the first power source being external to the physically secure environment; and
   c) providing additional circuitry connected to the power source and the cryptographic device to maintain a constant power drain on the power source as the cryptographic device performs various operations.

2. A method as described in claim 1 further comprising the step of locating at least a part of the additional circuitry within the secure environment.

3. A method as described in claim 2 wherein the additional circuitry comprises a current source and a voltage regulating circuit, the voltage regulating circuit being connected between the power input of the cryptographic device and ground.

4. A method as described in claim 3 wherein at least those parts of the additional circuitry carrying separate components of the total current from the power source are within the secure environment.

5. A method as described in claim 3 wherein the voltage regulating circuit comprises a zenner diode.

6. The method of claim 2 wherein the cryptographic operations generate a digital token for a postal indicium.

7. The method of claim 1 wherein the cryptographic operations generate a digital token for a postal indicium.

8. The method of claim 1 wherein the cryptographic operations generate a secure message for a value metering system.

9. A method of protecting a cryptographic device performing cryptographic operations from DPA attack, the method comprising the step of regulating the voltage at the power input of the cryptographic device to maintain a constant value, whereby the power drawn from a power supply for the cryptographic device is held constant.

10. The method of claim 9 wherein the cryptographic operations generate a digital token for a postal indicium.

11. The method of claim 9 wherein the cryptographic operations generate a secure message for a value metering system.

12. Apparatus for performing cryptographic operations comprising:
   a) a cryptographic device for performing the cryptographic operations;
   b) a physically secure environment enclosing the cryptographic device;
   c) a power source external to the physically secure environment for providing power to the cryptographic device; and
   d) additional circuitry connected to the first power source and the cryptographic device to maintain a constant power drain on the power source as the cryptographic device performs various operations.

13. Apparatus as described in claim 12 wherein the additional circuitry is located within the secure environment.

14. Apparatus as described in claim 13 wherein the additional circuitry comprises a current source and a voltage regulating circuit, the voltage regulating circuit being connected between the power input of the cryptographic device and ground.

15. Apparatus as described in claim 14 wherein at least those parts of the additional circuitry carrying separate components of the total current from the power source are within the secure environment.

16. Apparatus as described in claim 14 wherein the voltage regulating circuit comprises a zenner diode.

17. Apparatus as described in claim 12 wherein the cryptographic operations generate a digital token for a postal indicium.

18. Apparatus as described in claim 12 wherein the cryptographic operations generate a secure message for a value metering system.

* * * * *